United States Patent
Hill et al.

(10) Patent No.: US 8,902,708 B2
(45) Date of Patent: Dec. 2, 2014

(54) SYSTEM AND METHOD FOR SEISMIC BEAM FORMATION THAT ACCOUNTS FOR EQUIPMENT MISALIGNMENT

(75) Inventors: Norman Ross Hill, Houston, TX (US); Yue Wang, Danville, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 1009 days.

(21) Appl. No.: 12/613,442

(22) Filed: Nov. 5, 2009

(65) Prior Publication Data
US 2011/0103185 A1 May 5, 2011

(51) Int. Cl.
*G01V 1/28* (2006.01)
*G01V 1/36* (2006.01)

(52) U.S. Cl.
CPC .. *G01V 1/362* (2013.01); *G01V 1/28* (2013.01)
USPC ............ 367/59; 367/38; 367/53; 367/61

(58) Field of Classification Search
CPC ................................. G01V 1/28; G01V 1/362
USPC ........... 367/31, 38, 53, 75, 83, 59, 61; 702/13
See application file for complete search history.

(56) References Cited

U.S. PATENT DOCUMENTS 5,583,825 A * 12/1996 Carrazzone et al. ............ 367/31
2008/0225641 A1* 9/2008 Van Manen et al. ............ 367/38

OTHER PUBLICATIONS

Hill et al., "Beam Methods for Predictive Suppression of Seismic Multiples in Deep Water," SEG International Exposition and 72nd Annual Meeting, 2002.*
Press et al., "Numerical Recipes in C++: The Art of Scientific Computing," 2nd. Ed., Cambridge University Press, 2002, pp. 5-8.*
Schonewille, "Regularization with azimuth time-shift correction," SEG Expanded Abstracts, 2003.*
Hill et al., Salt-Flank Imaging Using Gaussian Beam Migration, Downloaded Nov. 2, 2009.
N. Ross Hill, Prestack Gaussian-beam depth migration, Geophysics, Jul.-Aug. 2001, pp. 1240-1250, vol. 66, No. 4, Society of Exploration Geophysicists.
Canning et al., Regularizing 3-D data sets with DMO, Geophysics, Jul.-Aug. 1996, pp. 1103-1114, vol. 61, No. 4, Society of Exploration Geophysicists.
Biondi et al., Azimuth moveout for 3-D prestack imaging, Geophysics, Mar.-Apr. 1998, pp. 574-588, vol. 63, No. 2, Society of Exploration Geophysicists.

* cited by examiner

*Primary Examiner* — Daniel L Murphy
(74) *Attorney, Agent, or Firm* — Marie L. Clapp (57) ABSTRACT

Seismic data representing the propagation of seismic energy through a geologic volume of interest is processed. The seismic energy propagates through the geologic volume of interest from one or more source locations at or near the geologic volume of interest to one or more detector locations at or near the geologic volume of interest. In processing the seismic data, the seismic energy is modeled as beams (e.g., Gaussian beams). The processing performed (i) corrects for misalignment of the one or more source locations and/or the one or more detector locations with a regular, predetermined mesh, and (ii) steers the seismic data based on the modeled beams.

15 Claims, 5 Drawing Sheets

SYSTEM AND METHOD FOR SEISMIC BEAM FORMATION THAT ACCOUNTS FOR EQUIPMENT MISALIGNMENT

FIELD OF THE INVENTION

The invention relates to processing seismic data in a manner that models seismic energy propagating through a geologic volume of interest and corrects for equipment misalignment present during data acquisition.

BACKGROUND OF THE INVENTION

Seismic field acquisition typically has some degree of irregularity in positions of the sources and/or detectors. For example, cultural obstacles such as drilling and production facilities cause irregularities in both marine and land recording geometries. For marine data, another cause of irregularity is cable feather.

Techniques for modeling seismic energy as beams are known. Generally, these techniques assume a regular acquisition mesh. Misalignment of equipment during acquisition of data is generally partially corrected by preprocessing steps before using conventional beam formation techniques.

SUMMARY OF THE INVENTION

One aspect of the invention relates to a method of processing seismic data representing the propagation of seismic energy through a geologic volume from one or more source locations, at which one or more sources of seismic energy are located, to a plurality of detector locations, at which detectors of seismic energy are located. The method is implemented in a computer system comprising one or more processors configured to execute one or more computer program modules. In one embodiment, the method comprises (a) identifying a midpoint location and an offset for the formation of locally beam steered components of the seismic data at or near a geologic volume of interest; (b) performing a ray-tracing such that rays traveling from a source location corresponding to the identified midpoint-offset location and rays traveling from a detector location corresponding to the identified midpoint-offset beaming location are determined, wherein the source location corresponding to the identified midpoint-offset beaming location and the detector location corresponding to the identified midpoint-offset beaming location are arranged on meshpoints of a regular, predetermined mesh for beam formation; (c) determining beam properties for beams of seismic energy propagating along each of the rays traced at operation (b); (d) identifying a midpoint dip; (e) identifying pairs of the beams of seismic energy, for which beam properties were determined at operation (b), such that the sum of the beam dip at the source location and the beam dip at the detector location equal the midpoint dip identified at operation (d); (f) determining offset dips for the beam pairs identified at operation (e) that make total travel times of the beam pairs identified at operation (e) stationary at points within the geologic volume of interest; (g) determining, as a function of time, beam dip at the source location and beam dip at the detector location for the pairs of the beams of seismic energy identified at operation (f), wherein the determination of source beam dip and detector beam dip as a function of time is based on the midpoint dip identified at operation (d) and the offset dips determined at operation (f); (h) obtaining a trace of seismic data at or near the midpoint-offset beaming location, wherein the trace of seismic data is derived from a recording of the seismic energy propagating through the geologic volume of interest from an actual source location to an actual detector location; (i) applying a time shift to the trace of seismic data obtained at operation (h), wherein the application of the time shift to the trace of seismic data effectively shifts the actual source location and the actual detector location of the trace of seismic data to the source location and the detector location arranged on stations of a regularly spaced recording mesh, and wherein the time shift is time varying, and is determined based on the beam dip at the source location as a function of time and the beam dip at the detector location as a function of time determined at operation (f); (j) summing the shifted trace of seismic data into a local slant stack corresponding to the midpoint dip identified at operation (d) for the midpoint-offset beaming location.

Another aspect of the invention relates to a computer system configured to stack a plurality of traces of seismic energy through a geologic volume. In one embodiment, the system comprises one or more processors operatively linked with electronic storage media that stores a plurality of traces of seismic energy, wherein the individual traces of seismic energy are derived from recordings made at individual ones of a plurality of actual detector locations of seismic energy propagating through the geologic volume of interest from an actual source location. The one or more processors are configured to execute one or more computer program modules. The computer program modules comprise a beam module, a beam pairing module, an offset dip module, a source/detector dip module, a shift module, and a stack module. The beam module is configured to perform ray-tracings for midpoint-offset beaming locations at or near the geologic volume of interest, and to determine beam parameters for beams of seismic energy propagating along the traced rays, wherein a ray-tracing for a given midpoint-offset beaming location results in the tracing of rays from a source location corresponding to the given midpoint-offset beaming location and the tracing of rays from a detector location corresponding to the given midpoint-offset beaming location, and wherein the source location and the detector location corresponding to the given midpoint-offset beaming location are arranged on meshpoints of a regular, predetermined mesh. The beam pairing module is configured to identify, for midpoint-offset beaming locations at or near the geologic volume of interest, sets of beam pairs for a plurality of midpoint dips such that an individual beam pair includes a beam from the source location corresponding to the given midpoint-offset beaming location and a beam from the detector location corresponding to the given midpoint-offset beaming location. The beam pairing module is further configured to identify a set of beam pairs for each value of midpoint dip such that the sum of the initial dip of the beam from the source location and the initial dip of the beam from the detector location equals the value of the midpoint dip. The offset dip module is configured to determine, for individual midpoint dips at individual midpoint-offset beaming locations, offset dips that makes total travel times stationary for beam pairs in the sets of beam pairs for the individual midpoint dips at the individual midpoint-offset beaming locations. The source/detector dip module is configured to determine, for individual midpoint dips at individual midpoint-offset beaming locations, beam dip at the source location and beam dip at the detector location as a function of time, wherein for the given midpoint dip at the given midpoint-offset beaming location the source/detector dip module determines the beam dip at the source location and the beam dip at the detector location as a function of time based on the offset dips determined for the beam pairs in the set of beam pairs for the given midpoint dip at the given midpoint-offset beaming location. The shift module is configured to apply time shifts to the traces of seismic data that effectively shift the one or more actual source locations and actual detector locations of the traces of seismic data to source locations and detector locations arranged on the stations of the regular recording mesh, wherein the time shifts are time varying, and wherein the time shifts applied to the traces of seismic data for the given midpoint dip at or near the given midpoint-offset beaming location are determined based on beam dip as a function of time at the source location corresponding to the given midpoint-offset beaming location and the beam dip as a function of time at the detector location corresponding to the given midpoint-offset beaming location. The stack module is configured to slant stack the traces of seismic data to which the shift module has applied a time shift.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
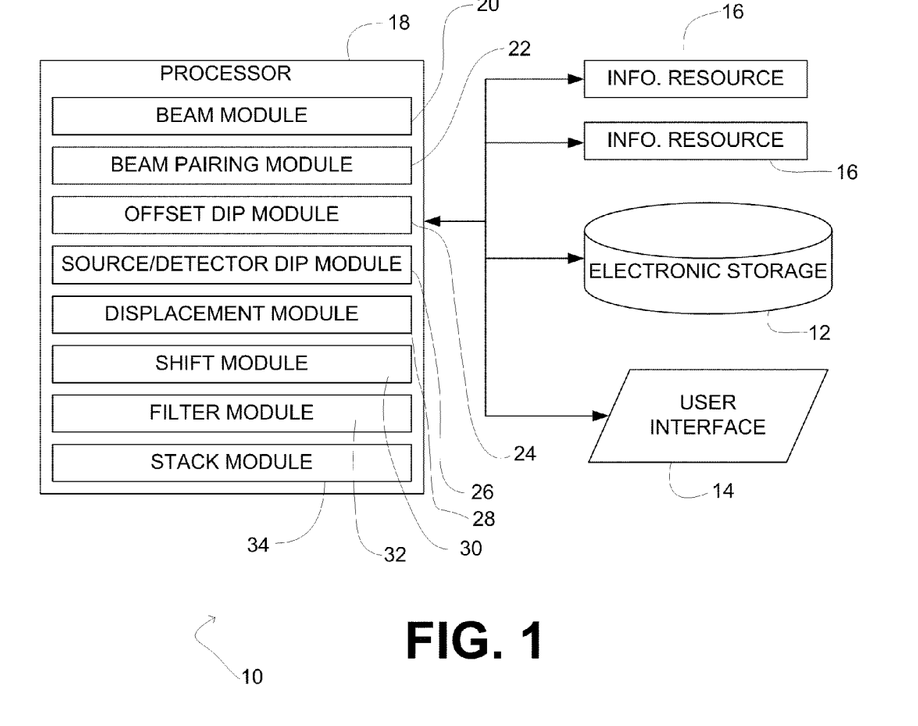
FIG. 1 illustrates a system configured to process seismic data representing the propagation of seismic energy through a geologic volume of interest, in accordance with one or more embodiments of the invention.

FIG. 1 illustrates a system 10 configured to process seismic data representing the propagation of seismic energy through a geologic volume of interest. The seismic energy propagates through the geologic volume of interest from one or more source locations at or near the geologic volume of interest to one or more detector locations at or near the geologic volume of interest. In processing the seismic data, system 10 models the seismic energy as beams (e.g., Gaussian beams). The processing performed by system 10 (i) corrects for misalignment of the one or more source locations and/or the one or more detector locations with a regularly spaced mesh of recording stations, and (ii) steers the seismic data based on the modeled beams. In one embodiment, system 10 comprises electronic storage 12, a user interface 14, one or more information resources 16, one or more processors 18, and/or other components.

In one embodiment, electronic storage 12 comprises electronic storage media that electronically stores information. The electronic storage media of electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may store software algorithms, information determined by processor 18, information received via user interface 14, information received from information resources 16, and/or other information that enables system 10 to function properly. Electronic storage 12 may be a separate component within system 10, or electronic storage 12 may be provided integrally with one or more other components of system 10 (e.g., processor 18).

User interface 14 is configured to provide an interface between system 10 and a user through which the user may provide information to and receive information from system 10. This enables data, results, and/or instructions and any other communicable items, collectively referred to as "information," to be communicated between the user and the system 10. As used herein, the term "user" may refer to a single individual or a group of individuals who may be working in coordination. Examples of interface devices suitable for inclusion in user interface 14 include a keypad, buttons, switches, a keyboard, knobs, levers, a display screen, a touch screen, speakers, a microphone, an indicator light, an audible alarm, and a printer. In one embodiment, user interface 14 actually includes a plurality of separate interfaces.

It is to be understood that other communication techniques, either hard-wired or wireless, are also contemplated by the present invention as user interface 14. For example, the present invention contemplates that user interface 14 may be integrated with a removable storage interface provided by electronic storage 12. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated by the present invention as user interface 14.

The information resources 16 include one or more sources of information related to the geologic volume of interest and/or the process of generating an image of the geologic volume of interest. By way of non-limiting example, one of information resources 16 may include seismic data acquired at or near the geologic volume of interest, information derived therefrom, and/or information related to the acquisition. The seismic data may include individual traces of seismic data, or the data recorded at on one channel of seismic energy propagating through the geologic volume of interest from a source. The information derived from the seismic data may include, for example, a velocity model, beam properties associated with beams used to model the propagation of seismic energy through the geologic volume of interest, Green's functions associated with beams used to model the propagation of seismic energy through the geologic volume of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the geologic volume of interest, and/or other information.

Processor 18 is configured to provide information processing capabilities in system 10. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device or computing platform, or processor 18 may represent processing functionality of a plurality of devices operating in coordination.

As is shown in FIG. 1, processor 18 may be configured to execute one or more computer program modules. The one or more computer program modules may include one or more of a beam module 20, a beam pairing module 22, an offset dip module 24, a source/detector dip module 26, a displacement module 28, a shift module 30, a filter module 32, a stack module 34, and/or other modules. Processor 18 may be configured to execute modules 20, 22, 24, 26, 28, 30, 32, and/or 34 by software; hardware; firmware; some combination of software, hardware, and/or firmware; and/or other mechanisms for configuring processing capabilities on processor 18.

It should be appreciated that although modules 20, 22, 24, 26, 28, 30, 32, and 34 are illustrated in FIG. 1 as being co-located within a single processing unit, in implementations in which processor 18 includes multiple processing units, one or more of modules 20, 22, 24, 26, 28, 30, 32, and/or 34 may be located remotely from the other modules. The description of the functionality provided by the different modules 20, 22, 24, 26, 28, 30, 32, and/or 34 described below is for illustrative purposes, and is not intended to be limiting, as any of modules 20, 22, 24, 26, 28, 30, 32, and/or 34 may provide more or less functionality than is described. For example, one or more of modules 20, 22, 24, 26, 28, 30, 32, and/or 34 may be eliminated, and some or all of its functionality may be provided by other ones of modules 20, 22, 24, 26, 28, 30, 32, and/or 34. As another example, processor 18 may be configured to execute one or more additional modules that may perform some or all of the functionality attributed below to one of modules 20, 22, 24, 26, 28, 30, 32, and/or 34.

The beam module 20 is configured to perform ray-tracings through the geologic volume of interest to determine central rays for beams of seismic energy that are propagated through the geologic volume of interest. The ray-tracings are performed by beam module 20 based on the recording geometry of the seismic data and/or information derived from the acquisition of the seismic data. The seismic data and/or the related information (e.g., recording geometry, etc.) may be obtained by beam module 20 from one of information resources 16, from electronic storage 12, from a user via user interface 14, and/or otherwise obtained. In one embodiment, beam module 20 uses a velocity model of the geologic volume of interest. The velocity model may be obtained from an external source, such as one of information resources 16.

In one embodiment, the ray-tracings performed by beam module 20 correspond to individual midpoint-offset beaming locations. In other words, the ray-tracings performed by beam module 20 correspond to individual sets of source location/detector location. As such, a given ray-tracing performed by beam module 20 will result in rays being traced in a plurality of directions from each of the source and detector locations corresponding to the given ray-tracing. For a given offset, the midpoint and angular sampling for the rays may be determined by relations such as those provided as equations (26) and (27) of Hill, N. R., 2001, Prestack Gaussian-beam depth migration: Geophysics, vol. 66, pp. 1240-1250 ("Hill"), which is incorporated herein by reference in its entirety.

In addition to determining central rays from the ray-tracings described above, beam module 20 is configured to determine other beam properties of the beams with central rays determined in the ray-tracings. The other beam properties may include one or more of travel time, beam width, amplitude, velocity, phase, raypath direction, and/or other beam properties at all points touched by a given beam. In one embodiment, beam module 20 determines the beam properties for Gaussian beams.

The beam pairing module 22 is configured to identify beam pairs for a given midpoint-offset beaming location based on midpoint dip. To identify such beam pairs, beam pairing module 22 analyzes sets of beams for which beam properties have been determined by beam module 20. In particular, for a given midpoint offset beaming location, beam pairing module 22 analyzes the beams traced from the source location corresponding to the given midpoint offset beaming location and the beams traced from the detector location corresponding to the given midpoint offset beaming location. In analyzing these beams, beam pairing module 22 pairs beams from the source location with beams from the detector location such that the sum of the dips of the paired beams, which is the midpoint dip of the beam pair, is constant.

Figure 4:
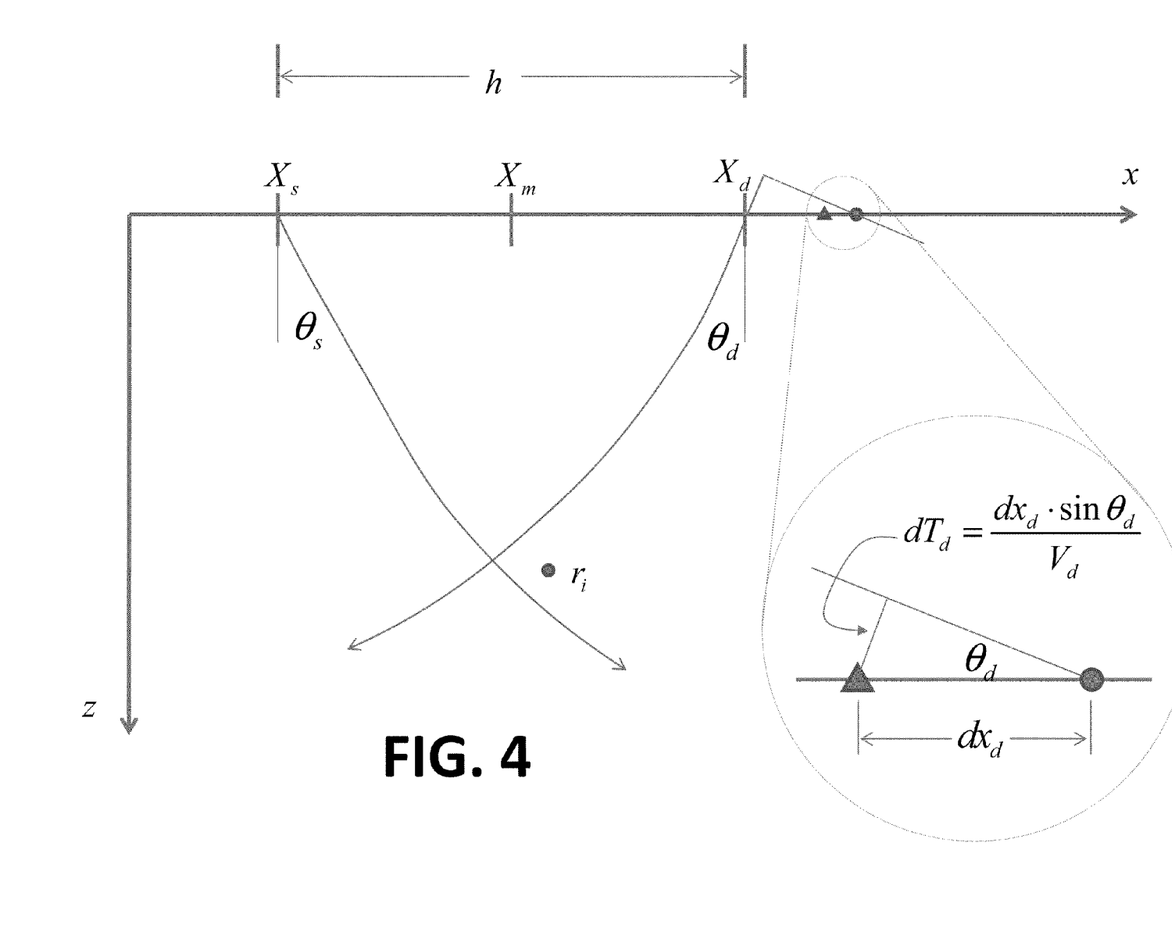
FIG. 4 illustrates a pair of source and detector rays through a geologic volume of interest, according to one or more embodiments of the invention.

Midpoint dip may be defined according to the following relationship:

$$P_m = P_s + P_d; \quad (1)$$

wherein $P_m$ represents midpoint dip, $P_s$ represents beam dip at the source location, and $P_d$ represents beam dip at the detector location. The source and detector dips are defined as:

$$P_s = \frac{\sin\theta_s}{V_s}, P_d = \frac{\sin\theta_d}{V_d}; \quad (2)$$

where $\theta_s$ and $\theta_d$ are the takeoff angles of the source ray and the detector rays, as is illustrated in FIG. 4, and $V_s$ and $V_d$ are the seismic velocities at the source and detector positions. Midpoint dip is the slope of an event traveltime as a function of midpoint when offset is held constant.

In one embodiment, in identifying beam pairs for a given midpoint-offset beaming location, beam pairing module 22 pairs beams from the source location with beams from the detector location such that the identified beam pairs have a predetermined midpoint dip. In this embodiment, beam pairing module 22 may make multiple passes through the beams for the given midpoint-offset beaming location to identify beam pairs at a plurality of different midpoint dips.

The offset dip module 24 is configured to determine offset dip for beam pairs identified by beam pairing module 22 that makes total travel time stationary with respect to offset dip. Generally, offset dip can be expressed as:

$$P_h = P_d - P_s; \quad (3)$$

where $P_h$ represents offset dip.

As will be appreciated, this determination is made for an individual beam pair separately for different points in the geologic volume of interest that are touched by both beams included in the individual beam pair. For instance, for a given beam pair at a given point $r_i$ within the geologic volume of interest that is touched by both beams in the given beam pair, offset dip module 24 determines offset dip for the given beam pair such that the total travel time of the beam pair through the given point $r_i$ is stationary. The total travel time can be expressed as a function of midpoint dip and offset dip as follows:

$$T_{total} = T_d(P_m + P_h) + T_s(P_m - P_h); \quad (4)$$

wherein $T_{total}$ represents total travel time, $T_d$ represents travel time from the detector location to the point $r_i$, and $T_s$ represents travel time from the source location to the point $r_i$. The stationary condition is $$\frac{\partial T_{total}}{\partial P_h} = 0. \quad (5)$$

Note that for the case of Gaussian beams the travel times are complex numbers.

In one embodiment, for an individual midpoint dip at a given midpoint-offset beaming location, offset dip module 24 determines offset dips for beam pairs having the individual midpoint dip that make total travel time stationary for the beam pairs through a plurality of points in the geologic volume of interest touched by the beam pairs. For example, by implementing the relationship set forth above in equation (4), offset dip module 24 may determine at individual points r within the geologic volume of interest one or more stationary total travel times $T_{total}$ and offset dips $P_h$ at which this stationary value occurs. This results in the determination of a plurality of data tuples $T_{total}(r_i)$, $P_h(r_i)$ for the individual midpoint dip at the given midpoint-offset beaming location.

In one embodiment, offset dip module 24 converts the data tuples $T_{total}(r_i)$, $P_h(r_i)$ into a determination of offset dip $P_h$ as a function of the real part of the stationary total travel time $(T_r = \text{Re}\{T_{total}\})$, which may be expressed as $P_h(T_r)$. For example, the data tuples $T_r(r_i)$, $P_h(r_i)$ may be plotted and/or otherwise correlated, and a function defining the offset dip $P_h$ as a function of travel time $T_r$ can be derived based on the trends between this relationship apparent form the data tuples $T_r(r_i)$, $P_h(r_i)$ as a whole. Since the determination of offset dip $P_h$ as a function of travel time $T_r$ by offset dip module 24 is for the individual midpoint dip, the determined function can be expressed with the individual midpoint dip as the data tuple $P_m$, $P_h(T_r)$, where $P_m$ is the individual midpoint dip. The principal contributions to the image occur at these stationary points because the beams in a nearby neighborhood sum constructively. These stationary values are therefore used to shift misaligned traces to nearby regularly spaced stations, as is illustrated in FIG. 4.

Returning to FIG. 1, the source/detector dip module 26 is configured to determine, for an individual midpoint dip at a given midpoint-offset beaming location, beam dip at the source location corresponding to the given midpoint-offset beaming location and beam dip at the detector location corresponding to the given midpoint-offset beaming location as functions of time. For example, from the data tuple $P_m$, $P_h(Tr)$ determined for the individual midpoint dip at the given midpoint-offset beaming location by offset dip module 24, source/detector dip module 26 may determine the beam dip at the source location $P_s$ and the beam dip at the detector location $P_d$ as functions of time from the relationships set forth above in equations (1) and (3).

Figure 5:
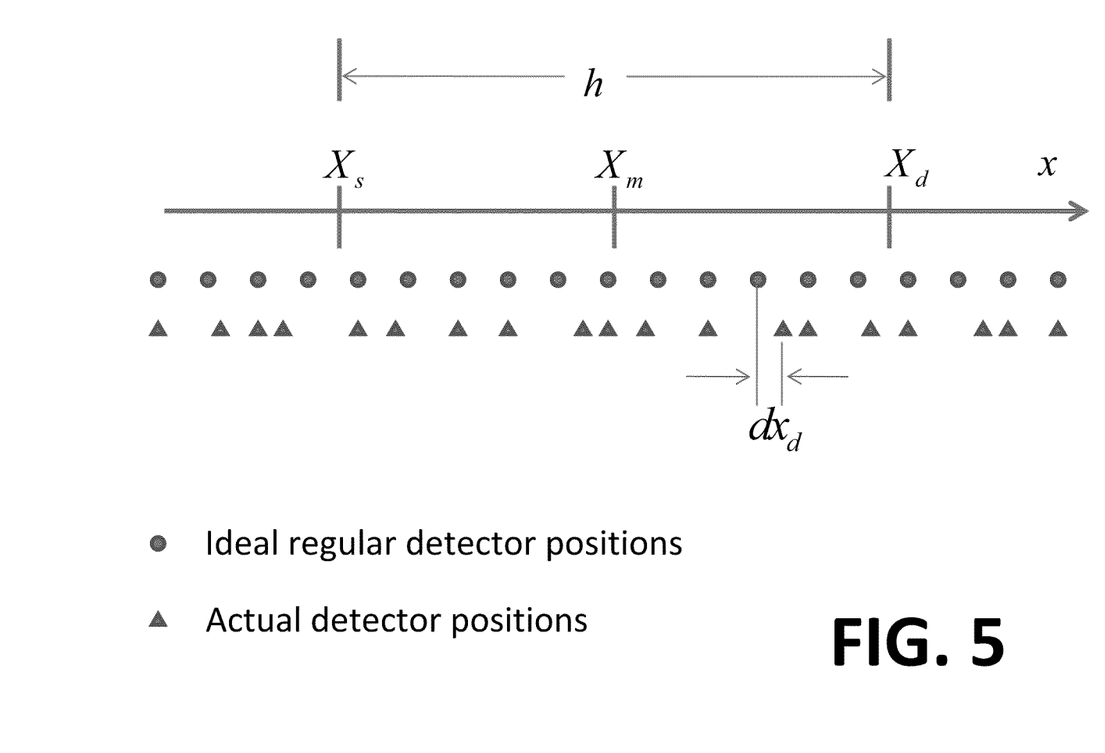
FIG. 5 illustrates misalignment of actual source and detector locations with source and detector stations on a regular, predetermined mesh, in accordance with one or more embodiments of the invention.

The displacement module 28 is configured to determine positional displacements of source and/or detector locations during data acquisition from regularly spaced recording stations that form a recording mesh (see FIG. 5). To determine positional displacement for a given source location (e.g., corresponding to a given midpoint-offset beaming location) during data acquisition, displacement module 28 compares the actual source location during the data acquisition with a source location on a nearby recording station of the regularly spaced recording mesh and determines a displacement distance therebetween. To determine positional displacement for a given detector location, displacement module 28 compares the actual detector location during data acquisition with a nearby recording station of the regularly spaced recording mesh and determines a displacement there between.

The shift module 30 is configured to apply time shifts to traces of seismic data that effectively shift that actual source and/or detector location(s) corresponding to the traces to source and/or detector location(s) on stations of the regularly spaced recording mesh. The time shifts applied by shift module 30 are time varying. For a given trace of seismic data from a source location to a detector location that correspond to a given midpoint-offset beaming location, the time shift applied to the given trace is determined by shift module 30 based on (i) beam dip at the source location as a function of time (e.g., as determined by source/detector dip module 26), (ii) beam dip at the detector location as a function of time (e.g., as determined by source/detector dip module 26), (iii) displacement between the actual source location and a source location on a station of the regularly spaced recording mesh (e.g., as determined by displacement module 28), and (iv) displacement between the actual detector location and a detector location on a station of the regularly spaced recording mesh (e.g., as determined by displacement module 28).

In one embodiment, shift module 30 determines the shift applied to the given trace according to the following relationship:

$$dT(T) = P_s(T) \cdot dx_s + P_d(T) \cdot dx_d; \quad (6)$$

where $dT(T)$ represents the time shift as a function of time, $dx_s$ represents the displacement between the actual source location and the source location on a station of the regularly spaced recording mesh, and $dx_d$ represents the displacement between the actual source location and the source location on a station of the regularly spaced recording mesh (see FIG. 5).

In one embodiment, the regularized traces are transformed to beams by a localized slant stacking operation such as described by Hill (2001) (see, e.g., equation (11) of Hill (2001)). This transformation may include a filter that localizes the traces in space about the beaming midpoint $X_m$.

$$f(\omega) = \exp\left(-\frac{1}{2} \frac{\omega}{\omega_0} \frac{(r_m - X_m)}{w_0^2}\right) \quad (7)$$

where $X_m$ represents the midpoint of the trace being filtered after the time shift is applied by shift module 30, $\omega$ represents frequency, $\omega_0$ represents a filtering frequency, and $r_m$ represents a point in the geologic volume of interest touched by the trace being filtered. This filter may be applied, for example by a filter module 32.

The stack module 34 is configured to stack traces. The traces near beaming midpoint location $X_m$ and offset h are stacked after being shifted and/or filtered as described above.

In one embodiment, stack module 34 slant stacks traces by applying a time delay to the traces before summing them. The time delay may be determined, for example, as:

$$\Delta T = P_m \cdot (r_m - X_m) \quad (8)$$

where $\Delta T$ represents the time delay (see, e.g., Hill (2001), equation (11)). This time delay and local stacking operation separates the recorded data into beam components.

After having been stacked at stack module 34, the resulting beam components of the seismic data may then be implemented to image the geologic volume of interest. The imaging may be performed by processor 18, and/or the stacked traces may be stored (e.g., to electronic storage 12) for processing at another time and/or on another system.

Figure 2:
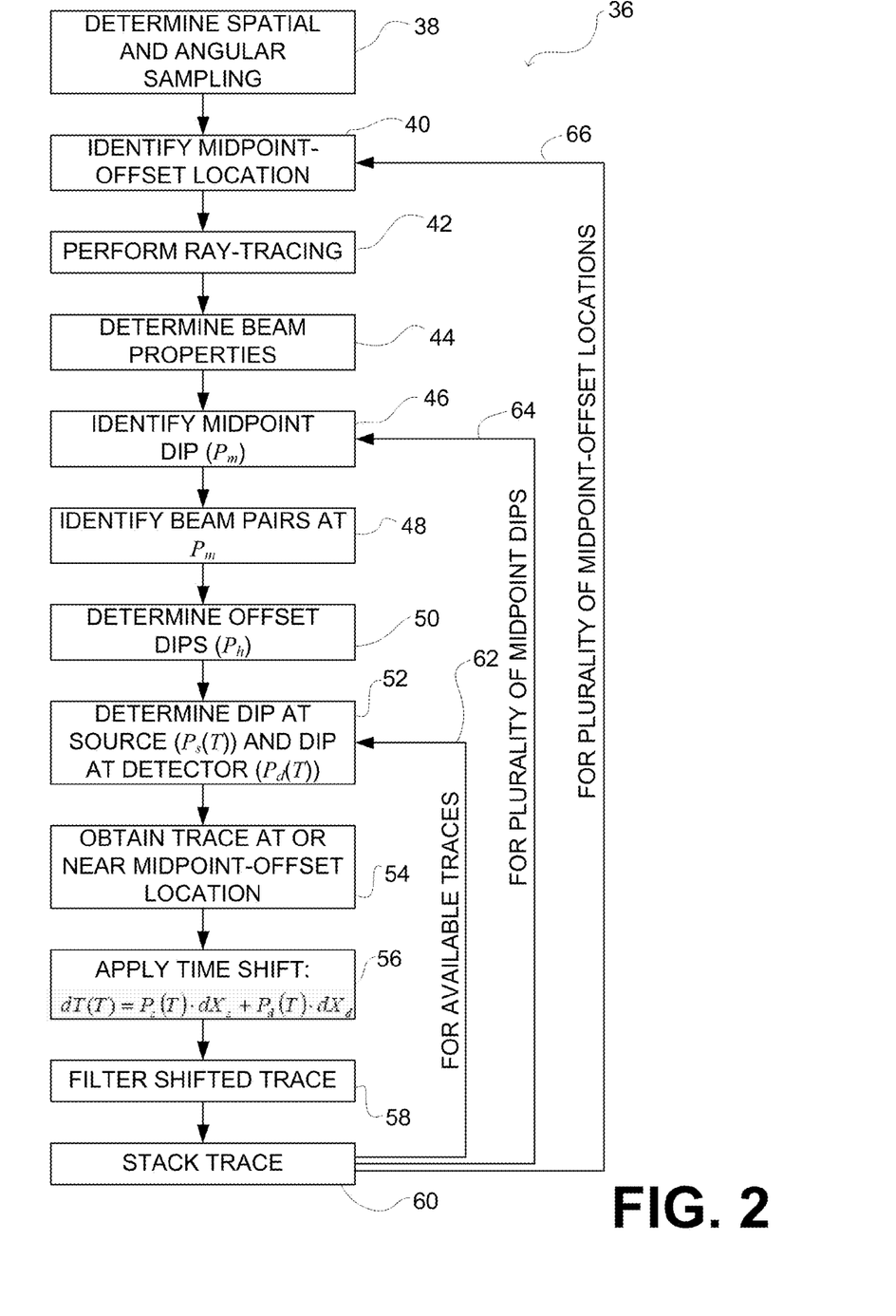
FIG. 2 illustrates a method of processing seismic data representing the propagation of seismic energy through a geologic volume of interest, in accordance with one or more embodiments of the invention.

FIG. 2 illustrates a method 36 of processing seismic data representing the propagation of seismic energy through a geologic volume of interest. The operations of method 36 presented below are intended to be illustrative. In some embodiments, method 36 may be accomplished with one or more additional operations not described, and/or without one or more of the operations discussed. Additionally, the order in which the operations of method 36 are illustrated in FIG. 2 and described below is not intended to be limiting.

In some embodiments, method 36 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 36 in response to instructions stored electronically on an electronic storage medium. The one or more processing devices may include one or more devices configured through hardware, firmware, and/or software to be specifically designed for execution of one or more of the operations of method 36.

At an operation 38, the spatial and angular sampling for beams of seismic energy through the geologic volume of interest is determined The spatial and angular sampling for the beams of seismic energy may be determined from the frequency bandwidth seismic data acquired at or near the geologic volume of interest and/or the beam sampling relations such as the ones that appear at equations (26) and (27) of Hill (2001).

More particularly, equation (26) of Hill (2001) specifies that a constant a that governs spatial sampling (e.g., to create a lattice of Dirac delta functions spaced at $2\pi/\alpha$) should be determined according to the following relationship:

$$a = 2w_l \sqrt{\frac{\omega_l}{\omega_h}} \quad (9)$$

where $w_i$ represents the initial width of a beam, $\omega_l$ represents a reference frequency at the lower end of the seismic data bandwidth, and $\omega_h$ represents a reference frequency at the higher end of the seismic data bandwidth.

Equation (27) of Hill (2001) specifies an angular sampling according to the following relationship:

$$\Delta P_x = \Delta P_y = \frac{1}{w_l \sqrt{\omega_l \omega_h}} \quad (10)$$

where $\Delta P_x$ and $\Delta P_y$ represent the angular spacing of sampling in the x and y directions, respectively.

At an operation 40 a midpoint-offset beaming location at or near the geologic volume of interest is identified. The midpoint-offset beaming location corresponds to a specific midpoint and offset. A source location corresponding to the midpoint-offset beaming location is expressed as:

$$X_s = X_m - h/2; \quad (11)$$

where $X_s$ represents the source location, $X_m$ represents the midpoint location of the midpoint-offset beaming location, and h represents the offset. Similarly, a detector location $X_d$ corresponding to the midpoint-offset beaming location is expressed as:

$$X_d = X_m + h/2. \quad (12)$$

FIG. 4 illustrates these relations along a single coordinate axis x; the quantities $X_d$, $X_s$, $X_m$ and h are in general two-dimensional vectors in a horizontal coordinate plane.

At an operation 42, a ray-tracing is performed for the identified midpoint-offset beaming location. In the ray-tracing, ray paths of rays traveling from the source location through the geologic volume of interest are determined, and ray paths of rays traveling from the detector location through the geologic volume of interest are determined In one embodiment, operation 42 is performed by a beam module 20 that is the same as or similar to beam module 20 (shown in FIG. 1 and described above).

At an operation 44, beam properties for beams of seismic energy propagating along the ray paths traced at operation 42 are determined The beam properties determined at operation 44 may include one or more of travel time, beam width, amplitude, velocity, phase, raypath direction, and/or other properties at all points touched by the beam. In one embodiment, operation 44 is performed by a beam module 20 that is the same as or similar to beam module 20 (shown in FIG. 1 and described above).

At an operation 46, a midpoint dip is identified. At an operation 48, beam pairs at the midpoint-offset beaming location having the midpoint dip from operation 46 are identified. Each beam pair may include a beam traveling from the source location and a beam traveling from the detector location such that beam dip at the source location and beam dip at the detector location satisfy the midpoint dip from operation 46 (e.g., $P_m = P_s + P_d$). In one embodiment, operation 48 is performed by a beam pairing module that is the same as or similar to beam pairing module 22 (shown in FIG. 1 and described above).

At an operation 50, offset dips that make total travel times of the beam pairs identified at operation 48 stationary at points within the geologic volume of interest are determined. In one embodiment, operation 50 is performed by an offset dip module that is the same as or similar to offset dip module 24 (shown in FIG. 1 and described above).

At an operation 52, for the beam pairs identified at operation 48, beam dip at the source location and beam dip at the detector location are determined as a function of time. The determination of beam dip at the source location and beam dip at the detector location is based on the midpoint dips and the offset dips determined for the beam pairs at operation 50. In one embodiment, operation 52 is performed by a source/ detector dip module that is the same as or similar to source/detector dip module 26 (shown in FIG. 1 and described above).

At an operation 54, a trace of seismic data at or near midpoint-offset beaming location is obtained. At an operation 56, a time shift is applied to the trace of seismic data that effectively shifts the actual source location and the actual detector location of the trace of seismic data to the source location and the detector location at stations of a regularly spaced recording mesh. The time shift is time varying. The time shift is based on beam dip at a source location corresponding to the given midpoint-offset beaming location and beam dip at a detector location corresponding to the given midpoint-offset beaming location as a function of time (e.g., as determined at operation 52 and as illustrated in FIG. 4), and is also based on a positional displacements between the actual source and detector locations of the seismic data trace and the source and detector locations at stations on the regularly spaced recording mesh, and/or based on other parameters. In one embodiment, operation 56 is performed by a shift module that is the same as or similar to shift module 30 (shown in FIG. 1 and described above).

At an operation 58, the shifted trace is filtered. In one embodiment, operation 58 is performed by a filter module that is the same as or similar to filter module 32 (shown in FIG. 1 and described above).

At an operation 60, the shifted trace may be stacked. The stacking may include applying a time delay to the shifted trace, and summing the shifted trace with other previously processed traces. In one embodiment, operation 60 is performed by a stack module that is the same as or similar to stack module 34.

Method 36 includes a loop 62 that loops back over operations 54, 56, 58, and/or 60 for all of the available traces of seismic data that are at or near the midpoint-offset beaming location. Upon completing loop 60, method 36 includes a loop 64 that loops back over operations 46, 48, 50, 52, and loop 60 for a plurality of midpoint dips at the midpoint-offset beaming location identified at operation 40. Upon completing loop 64, method 36 includes a loop 66 that loops back over operations 40, 42, 44, and loop 62 for a plurality of midpoint-offset beaming locations. In one embodiment, loop 66 actually includes two separate loops. For example one of the loops may loop over a plurality of midpoint locations at a given offset, while the other loop loops over a plurality offsets.

Figure 3:
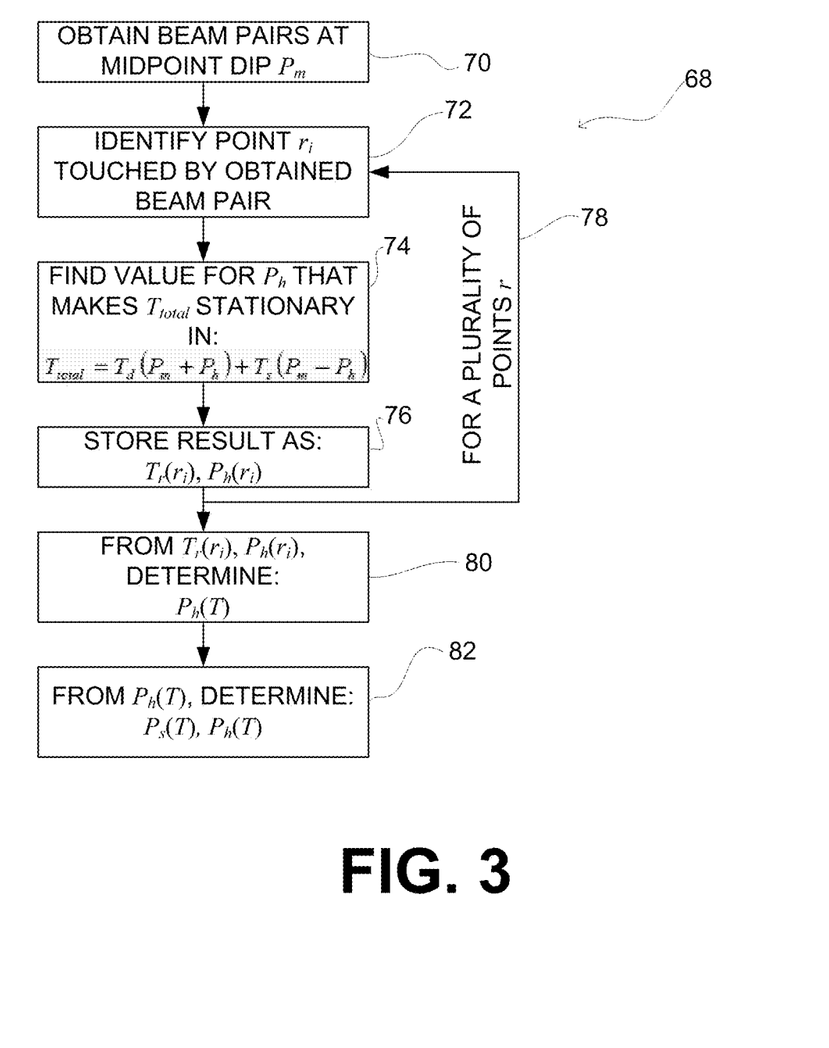
FIG. 3 illustrates a method of processing seismic data representing the propagation of seismic energy through a geologic volume of interest, in accordance with one or more embodiments of the invention.

FIG. 3 illustrates a method 68 of processing seismic data obtained at or near a geologic volume of interest. In particular, method 68 involves determining, for a given midpoint-offset beaming location and a given midpoint dip, beam dip at a source location corresponding to the given midpoint-offset beaming location and beam dip at a detector location corresponding to the given midpoint-offset beaming location as a function of time. In one embodiment, method 68 may be implemented as a component of an over-arching method. For example, method 68 may be implemented as operations 50 and/or 52 within method 36 shown in FIG. 2 and described above. This is not intended to be limiting, and method 68 may be implemented within a variety of other contexts.

The operations of method 68 presented below are intended to be illustrative. In some embodiments, method 68 may be accomplished with one or more additional operations not described, and/or without one or more of the operations discussed. Additionally, the order in which the operations of method 68 are illustrated in FIG. 3 and described below is not intended to be limiting.

In some embodiments, method 68 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 68 in response to instructions stored electronically on an electronic storage medium. The one or more processing devices may include one or more devices configured through hardware, firmware, and/or software to be specifically designed for execution of one or more of the operations of method 68.

At an operation 70, beam pairs at the midpoint-offset beaming location having the given midpoint dip are obtained. In one embodiment, operation 70 involves obtaining the output of an operation that is the same as or similar to operation 48 (shown in FIG. 2 and described above).

At an operation 72, a point within the geologic volume of interest is identified as being touched by both beams included in one of the beam pairs obtained at operation 70. In one embodiment, operation 72 is performed by an offset dip module that is the same as or similar to offset dip module 24 (shown in FIG. 1 and described above).

At an operation 74, an offset dip for the beam pair that touches the point within geologic volume of interest identified at operation 72 is determined Specifically, the offset determined at operation 74 makes total travel time for the beam pair at the point within the geologic volume of interest stationary. In one embodiment, operation 74 is performed by an offset dip module that is the same as or similar to offset dip module 24 (shown in FIG. 1 and described above).

At an operation 76, the offset dip determined at operation 74 is stored as a data tuple, or set, with the travel time for the beam pair through the point in the geologic volume of interest at the determined offset dip. In one embodiment, operation 76 is performed by an offset dip module that is the same as or similar to offset dip module 24 (shown in FIG. 1 and described above).

Method 68 includes a loop 78 that loops back over operations 72, 74, and 76 for a plurality of points that are touched by one or more of the beam pairs obtained at operation 70. Upon completing loop 78, method 68 proceeds to an operation 80.

At the operation 80, offset dip for the beam pairs obtained at operation 70 is determined as a function of time. This determination is based on the data tuples stored at operation 76. In one embodiment, operation 80 is performed by an offset dip module that is the same as or similar to offset dip module 24 (shown in FIG. 1 and described above).

At an operation 82, for the given midpoint-offset beaming location and the given midpoint dip, beam dip at the source location and beam dip at the detector location are determined as a function of time. Specifically, from the relationship describing offset dip as a function of time that is determined at operation 80, and from the given midpoint dip, beam dip at the source location and beam dip at the detector location are determined In one embodiment, operation 82 is performed by a source/detector dip module that is the same as or similar to source/detector dip module 26 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of processing seismic data representing the propagation of seismic energy through a geologic volume from one or more source locations, at which one or more sources of seismic energy are located, to a plurality of detector locations, at which detectors of seismic energy are located, wherein the method is implemented in a computer system comprising one or more processors configured to execute one or more computer program modules, the method comprising:

(a) identifying a midpoint-offset beaming location at or near a geologic volume of interest;

(b) performing, via the one or more processors, a ray-tracing such that rays traveling from a source location corresponding to the identified midpoint-offset beaming location and rays traveling from a detector location corresponding to the identified midpoint-offset beaming location are determined, wherein the source location corresponding to the identified midpoint-offset beaming location and the detector location corresponding to the identified midpoint-offset beaming location are arranged on meshpoints of a regularly spaced recording mesh;

(c) determining, via the one or more processors, beam properties for beams of seismic energy propagating along each of the rays traced at operation (b);

(d) identifying, via the one or more processors, a midpoint dip;

(e) identifying, via the one or more processors, pairs of the beams of seismic energy, for which beam properties were determined at operation (b), that form paths from the source location and from the detector location such that the sum of the beam dip at the source location and the beam dip at the detector location equal the midpoint dip identified at operation (d);

(f) determining, via the one or more processors, offset dips for the beam pairs identified at operation (e) that make total travel times of the beam pairs identified at operation (e) stationary at points within the geologic volume of interest;

(g) determining, as a function of time, via the one or more processors, beam dip at the source location and beam dip at the detector location for the pairs of the beams of seismic energy identified at operation (e), wherein the determination of source beam dip and detector beam dip as a function of time is based on the midpoint dip identified at operation (d) and the offset dips determined at operation (f);

(h) obtaining a trace of seismic data at or near the midpoint-offset beaming location, wherein the trace of seismic data is derived from a recording of the seismic energy propagating through the geologic volume of interest from an actual source location to an actual detector location, wherein at least one of the actual source location and the actual detector location is not on the regularly spaced recording mesh;

(i) applying, via the one or more processors, a time shift to the trace of seismic data obtained at operation (h), wherein the application of the time shift to the trace of seismic data effectively shifts the actual source location and the actual detector location of the trace of seismic data to the source location and the detector location arranged on stations of the regularly spaced recording mesh, and wherein the time shift is time varying, and is determined based on the beam dip at the source location as a function of time and the beam dip at the detector location as a function of time determined at operation (f);

(j) transforming, via the one or more processors, the shifted trace of seismic data into a beam by a localized slant stacking operation using the midpoint dip identified at operation (d) for the midpoint-offset beaming location.

2. The method of claim 1, further comprising (k) repeating operations (h)-(j) for a plurality of traces of seismic data at or near the midpoint-offset beaming location.

3. The method of claim 2, further comprising (l) repeating operations (d)-(k) for a plurality of midpoint dips.

4. The method of claim 3, further comprising (m) repeating operation (a)-(l) for a plurality of midpoint-offset beaming locations.

5. The method of claim 1, further comprising:
subsequent to operation (h), determining positional displacements of the actual source location and the actual detector location of the obtained trace of seismic energy,
wherein the positional displacement for the actual source location is the positional misalignment between the actual source location and the source location on a station of the regularly spaced recording mesh,
wherein the positional displacement for the actual detector location is the positional misalignment between the actual detector location and the detector location on a station of the regularly spaced recording mesh, and
wherein the time shift applied to the trace of seismic data at operation (i) is determined based further on the positional displacements for the actual source location and for the actual detector location.

6. The method of claim 1, wherein (g) determining, as a function of time, beam dip at the source location and beam dip at the detector location for the pairs of the beams of seismic energy identified at operation (f) comprises:

(i) identifying a point within the geologic volume of interest touched by both beams from a pair of beams of seismic energy identified at operation (e);

(ii) determining an offset dip of the pair of beams of seismic energy that touch the point identified at (i) that makes the total travel time stationary for the pair of beams of seismic energy through the point within the geologic volume of interest;

(iii) storing as a set, the offset dip determined at operation (ii) and the stationary travel time of the pair of beams of seismic energy that touch the point identified at (i) for the determined offset dip; and (iv) repeating operations (i)-(iii) for a plurality of points within the geologic volume of interest touched by both beams from a pair of beams of seismic energy identified at operation (e).

7. The method of claim 6, wherein (g) determining, as a function of time, beam dip at the source location and beam dip at the detector location for the pairs of the beams of seismic energy identified at operation (f) further comprises determining offset dip as a function of time from the sets of offset dip and travel time stored at operation (iv).

8. The method of claim 1, wherein the ray-tracing performed at operation (b) is based on a velocity model of the geologic volume of interest.

9. A computer system configured to stack a plurality of traces of seismic energy through a geologic volume, the system comprising:
one or more processors operatively linked with electronic storage media that stores a plurality of traces of seismic energy, wherein the individual traces of seismic energy are derived from recordings made at individual ones of a plurality of actual detector locations of seismic energy propagating through the geologic volume of interest from an actual source location and wherein at least one of the actual source location and the actual detector locations is not on a regularly spaced recording mesh, and the one or more processors being configured to execute on or more computer program modules, the computer program modules comprising:

a beam module configured to perform ray-tracings for midpoint-offset beaming locations at or near the geologic volume of interest, and to determine beam parameters for beams of seismic energy propagating along the traced rays, wherein a ray-tracing for a given midpoint-offset beaming location results in the tracing of rays from a source location corresponding to the given midpoint-offset beaming location and the tracing of rays from a detector location corresponding to the given midpoint-offset beaming location, and wherein the source location and the detector location corresponding to the given midpoint-offset beaming location are arranged on stations of the regularly spaced recording mesh;

a beam pairing module configured to identify, for midpoint-offset beaming locations at or near the geologic volume of interest, sets of beam pairs for a plurality of midpoint dips such that a set of beam pairs for a given midpoint dip have elements made up of a beam from a source location and a beam from a detector location such that the sum of the dip of the beam at the source location and the dip of the beam at the detector location equals the given midpoint dip;

an offset dip module configured to determine, for individual midpoint dips at individual midpoint-offset beaming locations, offset dips that make total travel times stationary for beam pairs in the sets of beam pairs for the individual midpoint dips at the individual midpoint-offset beaming locations;

a source/detector dip module configured to determine, for individual midpoint dips at individual midpoint-offset beaming locations, beam dip at the source location and beam dip at the detector location as a function of time, wherein for the given midpoint dip at the given midpoint-offset beaming location the source/detector dip module determines the beam dip at the source location and the beam dip at the detector location as a function of time based on the offset dips determined for the beam pairs in the set of beam pairs for the given midpoint dip at the given midpoint-offset beaming location;

a shift module configured to apply time shifts to the traces of seismic data that effectively shift the one or more actual source locations and the actual detector locations of the traces of seismic data to source locations and detector locations arranged on stations of a regularly spaced recording mesh, wherein the time shifts are time varying, and wherein the time shifts applied to the traces of seismic data for the given midpoint dip at or near the given midpoint-offset beaming location are determined based on beam dip as a function of time at the source location corresponding to the given midpoint-offset beaming location and the beam dip as a function of time at the detector location corresponding to the given midpoint-offset beaming location; and a stack module configured to slant stack the traces of seismic data to which the shift module has applied a time shift, thereby separating the traces of seismic data into beam components.

10. The system of claim 9, wherein the one or more computer program modules further comprise:

a displacement module configured to determine positional displacements for the one or more actual source locations and the actual detector locations, wherein the positional displacement for a given actual source location is the positional misalignment between the given actual source locations and a source location on a station of the regularly spaced recording mesh, wherein the positional displacement for a given actual detector location is the positional misalignment between the given actual detector locations and a detector location on a station of the regularly spaced recording mesh, and wherein the time shift applied by the shift module to a trace of seismic data associated with the given actual source location and the actual detector location is determined based further on the positional displacements for the given actual source location and the given actual detector location.

11. The system of claim 9, wherein, the offset dip module is further configured to:

(i) identify a point within the geologic volume of interest touched by both beams from a pair of beams in the set of beam pairs for the given midpoint dip at the given midpoint-offset beaming location;

(ii) determine an offset dip of the pair of beams of seismic energy that touch the point identified at (i) that makes the total travel time stationary for the pair of beams of seismic energy;

(iii) store as a set, the offset dip determined at operation (ii) and the stationary travel time of the pair of beams of seismic energy that touch the point identified at (i) for the determined offset dip; and (iv) repeat operations (i)-(iii) for a plurality of points within the geologic volume of interest touched by both beams from one or more pairs of beams of in the set of beam pairs for the given midpoint dip at the given midpoint-offset beaming location.

12. The system of claim 11, wherein the offset dip module is further configured to:

determine offset dip as a function of time for the given midpoint dip at the given midpoint-offset beaming location from the sets of offset dip and travel time stored at operation (iv) for the given midpoint dip at the given midpoint-offset beaming location.

13. The system of claim 9, wherein the beam module is configured to perform the ray-tracings for midpoint-offset beaming locations at or near the geologic volume of interest based on a velocity model of geologic volume of interest.

14. The system of claim 9, wherein the one or more computer modules further comprise a filter module configured to filter traces to which the shift module has applied time shifts.

15. The system of claim 9, wherein the stacked traces are implemented in a migration.

* * * * *